(12) United States Patent
Yeh et al.

(10) Patent No.: US 7,360,718 B2
(45) Date of Patent: Apr. 22, 2008

(54) SPRINKLER HOUSING WITH SIDE INLET

(75) Inventors: Jonathan Yeh, Chino, CA (US); Bob Patterson, Long Beach, CA (US)

(73) Assignee: Rain Bird Corporation, Azusa, CA (US)

( * ) Notice: Subject to any disclaimer, the term of this patent is extended or adjusted under 35 U.S.C. 154(b) by 0 days.

(21) Appl. No.: 10/987,401

(22) Filed: Nov. 12, 2004

(65) Prior Publication Data

US 2006/0108444 A1 May 25, 2006

(51) Int. Cl.
*B05B 15/10* (2006.01)
(52) U.S. Cl. ............... 239/204; 239/201; 239/203; 239/205; 239/DIG. 19
(58) Field of Classification Search ............ 138/40, 138/44, 108, 113, 115, 172, 153, 174; 239/201, 239/203, 204, 205, 206, DIG. 19
See application file for complete search history.

(56) References Cited

U.S. PATENT DOCUMENTS

| | | | | | |
|---|---|---|---|---|---|
| 2,005,385 | A | * | 6/1935 | O'Hara ..................... 285/119 |
| 3,776,253 | A | * | 12/1973 | Yamaguchi et al. ........ 138/109 |
| 4,078,726 | A | * | 3/1978 | Walto ........................ 239/205 |
| 4,317,023 | A | * | 2/1982 | Gryskiewicz .......... 219/121.72 |
| 4,343,358 | A | * | 8/1982 | Gryskiewicz ............... 166/227 |
| 4,406,326 | A | * | 9/1983 | Wagner ....................... 166/227 |
| 4,448,353 | A | * | 5/1984 | Livne ......................... 239/205 |
| 5,551,733 | A | * | 9/1996 | Henwood ............... 285/133.11 |
| 6,193,168 | B1 | * | 2/2001 | Bedford ..................... 239/204 |
| 6,488,218 | B1 | * | 12/2002 | Townsend et al. .......... 239/205 |
| 6,530,531 | B2 | * | 3/2003 | Butler ......................... 239/205 |
| 2002/0092924 | A1 | * | 7/2002 | Ingham et al. .............. 239/205 |

OTHER PUBLICATIONS

Rain Bird Corporation Tech Specs, 1800 Series Spray Heads, 2002, 4 pp.
Rain Bird Corporation, Part/Full Circle Rotor, Catalog No. 414, Illustrates a commercially available sprinkler body prior to Nov. 12, 2003, 1 p.
Rain Bird Corporation, Part/Full Circle Rotor, Catalog No. 416, Illustrates a commercially available sprinkler body prior to Nov. 12, 2003, 1 p.

* cited by examiner

*Primary Examiner*—Dinh Q. Nguyen
*Assistant Examiner*—Jason Boeckmann
(74) *Attorney, Agent, or Firm*—Fitch, Even, Tabin & Flannery

(57) ABSTRACT

The invention is directed to a sprinkler body having a side inlet and improved strength and durability. The side inlet is reinforced with additional structure at a cylindrical wall defining the side inlet. The structure may include a reinforcement rib located within the sprinkler body and intersecting the side inlet. The structure may include a plate located within the cylindrical wall, and the plate may include a collar and/or a crosspiece spanning the side inlet. The structure permits passage of water therethrough and serves to reinforce localized weakened portions or stress concentrators of the side inlet or the sprinkler body.

12 Claims, 4 Drawing Sheets

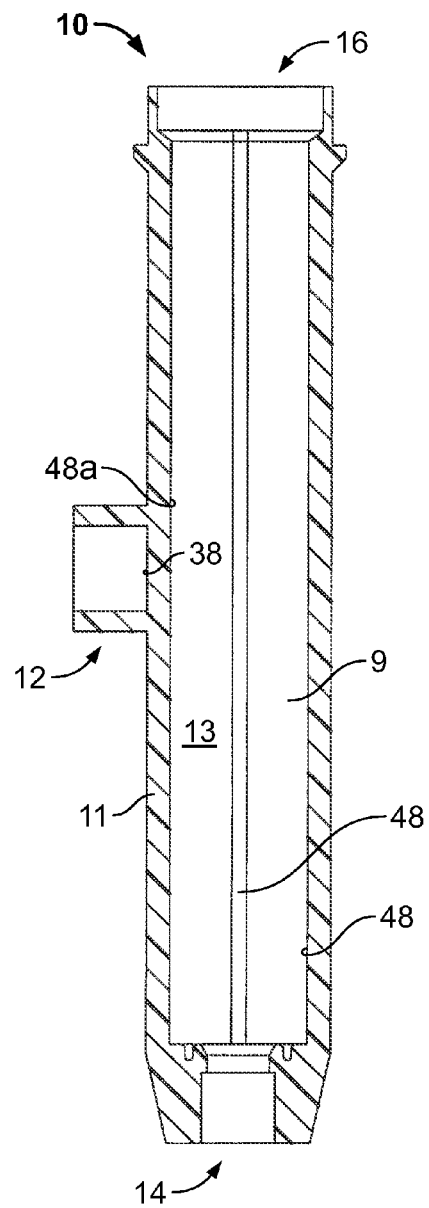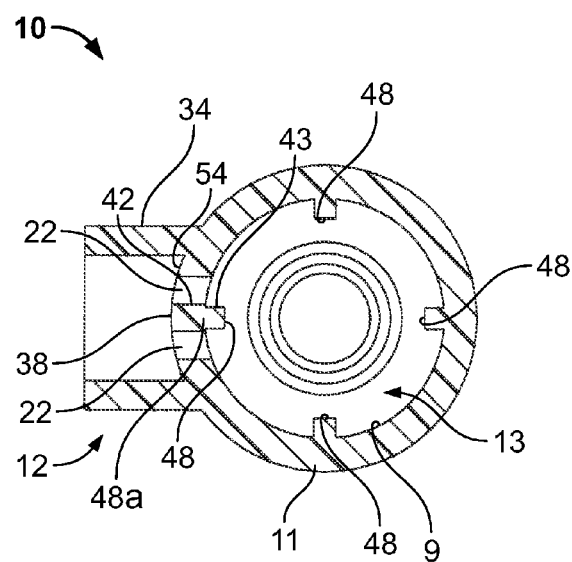
FIG. 4
FIG. 5

SPRINKLER HOUSING WITH SIDE INLET

FIELD OF THE INVENTION

The invention is directed to a sprinkler housing having a side inlet and, in particular, to a sprinkler body having a side inlet with improved durability.

BACKGROUND OF THE INVENTION

Irrigation systems utilize a series of pipes or conduits for conveying water from a water source to a series or network of water emitters or sprinklers. Though at one time metallic pipes were used, these suffered from exterior rust and corrosion, as well as interior fouling, and carried a high materials expense. Coatings were developed which promoted the life of metallic pipes, and the use of large diameter pipes helped alleviate the problems with interior fouling. However, cost remained an issue until polymeric piping was developed.

Polymer or plastic piping offered additional benefits. For instance, threading and sealing of plastic joints is simpler and more reliable. One drawback to plastic piping has traditionally been its strength, particularly in localized regions containing stress concentrators or non-uniform mechanical properties.

A common irrigation component is a sprinkler utilizing a pop-up spray head. This type often includes a deflector plate secured to a base assembly coupled to a riser or other tube. The riser is received within a sprinkler body that is typically stationary and buried in the ground with a generally vertical orientation. In this manner, the riser and spray head may move between an extended and elevated position relative to a sprinkler body and a retracted and lower position where the riser is substantially received within the sprinkler body. When extended, the spray head is positioned above the ground level to water the surrounding area.

The length of the sprinkler body is typically dependent on the riser length. That is, a typical sprinkler body with a length of 4 inches may be coupled with a riser having a length of 2 inches, while another sprinkler body of 16 inches may be used with a 12 inch riser. In relatively shorter forms of the sprinkler body, the water may be received from the water source at a lower end of the sprinkler body. However, relatively longer forms for the sprinkler body usually require a side inlet. This may also vary depending on the irrigation application.

Though much plastic piping can be formed as a continuous length by extrusion, for instance, other components to the irrigation system are made by injection molding. Injection molding often leads to non-uniform mechanical properties, such as a weakened point or weakening feature referred to as a knit line. Specifically, thermoplastic polymers flow at a rate dependent on their temperature. The polymeric materials are typically forced into a mold with a temperature lower than that of the plastic. Therefore, the plastic begins to cool on contact. This cooling is most pronounced at the leading edge of the injection flow, and the leading edge begins to solidify and develop a surface texture as it flows through the mold. When two leading edges meet, a visible line referred to as a knit or mold line is formed. It is known that the plastic material localized at the knit line does not tend to form as strong a bond because the polymer strands do not join and flow as well. Therefore, the knit line does not bond as well and tends to be more brittle. Though the sprinkler bodies maybe reinforced with fibers such as fiberglass, these fibers do not often cross the knit line weld interface, so the knit line does not realize the benefits of the presence of the fibers. Therefore, the knit line typically weakens the piping.

One example of a component made with such a process is the sprinkler body having a side inlet. Because the geometry of a sprinkler body does not lend itself to extrusion molding, injection molding tends to be more practical to construct the body and the side inlet, as well as a short cylindrical wall that typically surrounds the inlet. From a manufacturing standpoint, principal injection techniques for forming such a sprinkler body often result in the knit line being coincident with or bisecting the side inlet and the cylindrical wall.

In service, it is not uncommon for the sprinkler body to be filled with water even when the spray head is not presently emitting water. Prior to an off season, the sprinkler is cleared with air so that water does not freeze within the system, which would otherwise cause potentially catastrophic damage. Otherwise, in the absence of some type of bleed control for releasing pressure, the sprinkler body contains a full, static volume of water. In order to activate the sprinkler, the water source is opened such that a pressure surge is applied to the system, thereby forcing water through the system, raising the pop-up heads, and allowing water to be emitted.

The maximum stress is experienced when the pressure surge is transmitted to the full sprinkler body. That is, the pressure directed through the sprinkler body is not free to simply pass through as the standing water in the sprinkler body must be energized to overcome its static state. This creates the highest stress on the sprinkler body. The location of the maximum stress when such a pressure surge is transmitted is the stress concentrators of the sprinkler body. More specifically, the highest stress concentrator is the knit line bisecting the side inlet and the cylindrical wall.

One method for examining the strength and durability of a sprinkler body is by repeatedly recreating these conditions. Known as cycle-surge durability testing, a plugged, water-filled sprinkler body is subjected to a series of repeated high-pressure surges at levels often in excess of conditions typically used by a consumer. This allows for recognizing long-term performance deficiencies. In performing such tests, it has been found that sprinkler bodies with a side inlet underperform bodies without a side inlet. More particularly, the side-inlet sprinkler body often fails by rupturing proximate the side inlet and along the knit line.

Accordingly, it is desired for a side-inlet sprinkler body having improved performance and structural integrity.

BRIEF DESCRIPTION OF THE DRAWINGS

FIG. 4 is a cross-sectional view of the sprinkler body of FIG. 1;

FIG. 5 is a cross-sectional view of the sprinkler body of FIG. 2 generally along line 5-5 of FIG. 2;

DESCRIPTION OF THE PREFERRED EMBODIMENTS

Figure 6:
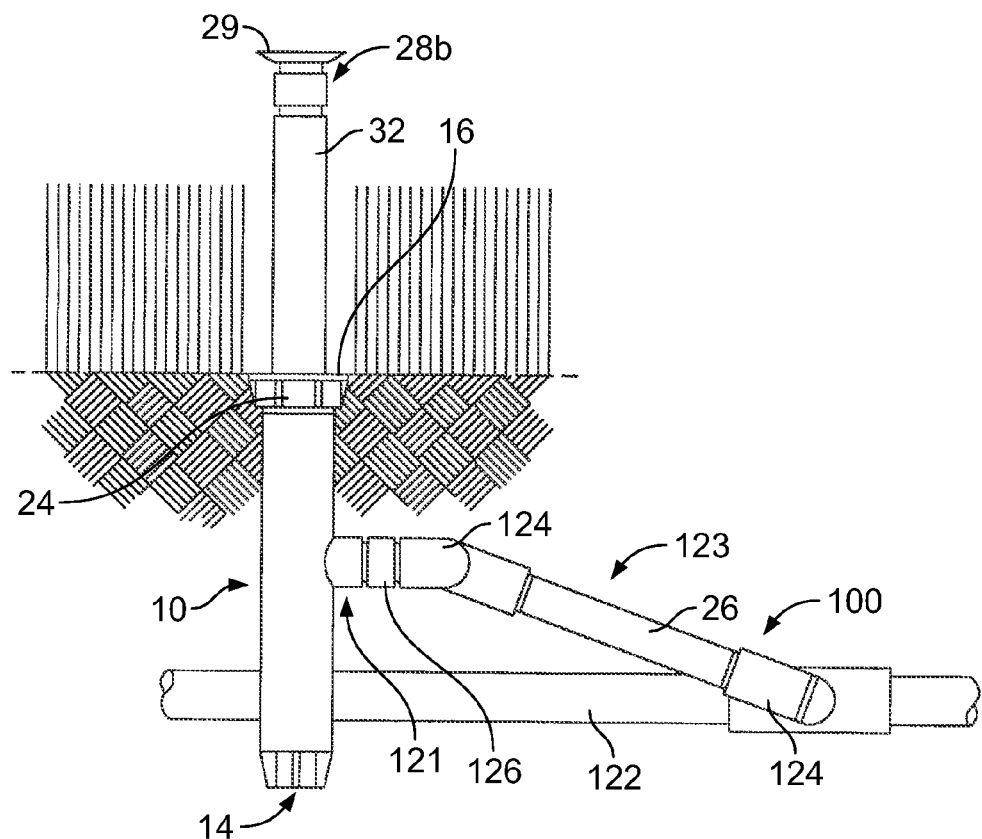
FIG. 6 is an environmental schematic of an exemplary irrigation system including the sprinkler body of FIG. 1 and a first form of a connection to the side inlet.
Figure 7:
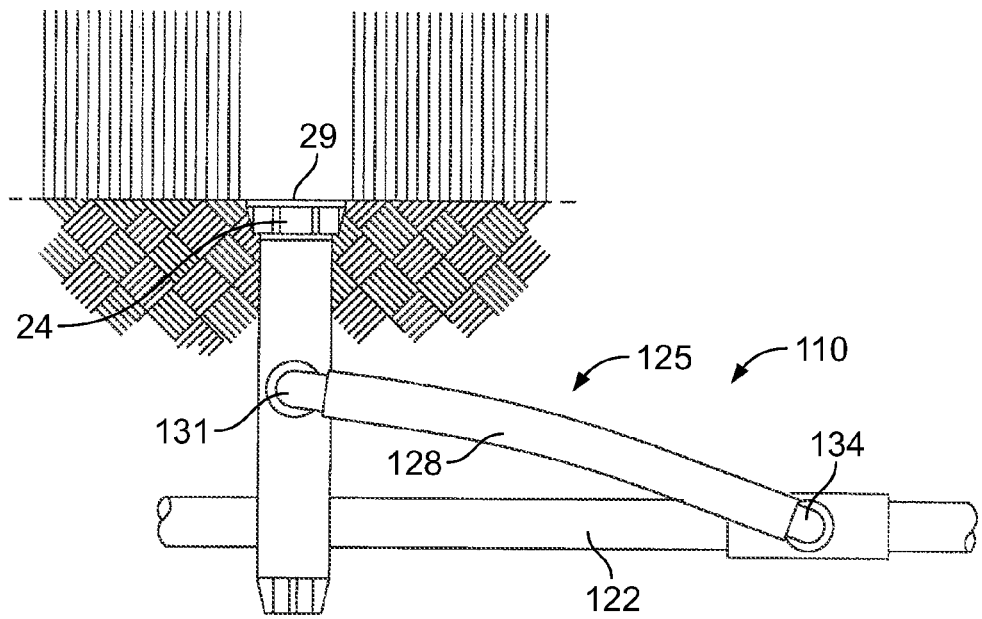
FIG. 7 is an environmental schematic of an exemplary irrigation system including the sprinkler body of FIG. 1 and a second form of a connection to the side inlet.

Referring initially to FIGS. 1-5, a sprinkler body 10 is illustrated having a generally tubular wall 11 with an internal surface 9, a side inlet 12, a bottom inlet 14, and a riser opening 16. The riser opening 16 of the sprinkler body 10 receives a riser 32 (see FIGS. 1 and 6), and the riser 32 may move between an extended position (FIG. 6) and a retracted position (FIG. 7). More specifically, the application of water pressure into the sprinkler body 10 forces the riser 32 to move from a generally retracted position, substantially within the sprinkler body 10, to a position extended from and above the sprinkler body 10 for emitting water to a surrounding area. When water is shut off, the riser 32 retracts from the extended position, preferably biased towards the retracted position by a spring 17.

The length of the sprinkler body 10 is dependent on the length of the riser 32, which is in turn dependent on the application for the sprinkler and the surrounding environment. For shorter risers 32, the sprinkler body 10 is similarly short. Conversely, longer risers 32 require a longer sprinkler body 10. When installed with a sprinkler system, the sprinkler body 10 is sunk into the ground and is connected to the water source through piping that is also sunk, as can be seen in FIGS. 6 and 7. In the event the water source piping is connected to the bottom inlet 14 inlet, at least a portion of the water source piping must also be sunk in the ground to that depth. In order to minimize the depth to which the water source piping must be sunk, the sprinkler body 10 is provided with the side inlet 12 for connection to the water source piping.

During installation, the inlets 12, 14 are either selectively connected to the water source or capped. That is, the side inlet 12 may be connected to the water source when the bottom inlet 14 is capped, or the side inlet 12 may be capped as the bottom inlet 14 receives water from the water source. The internal pressure surge and fluctuation from activating or de-activating the water pressure causes stress at the side inlet 12, regardless of whether the side inlet 12 is capped or not.

The water source may deliver water to the sprinkler body 10 through either inlet 12, 14 into an elongate cavity 13 defined by the internal surface 9 of the sprinkler body 10. The side inlet 12 defines a passage 20 for permitting water received from the water source to enter the sprinkler body 10 and includes a cylindrical wall 34 for connecting to a delivery system 100 (see FIGS. 6, 7).

The sprinkler body 10 may be provided with reinforcement structure in the form of one or more reinforcement members. In one form, the internal surface 9 of the sprinkler body 10 includes a plurality of reinforcement members in the form of longitudinally oriented ribs 48 radially located at circumferentially spaced intervals. These ribs 48 cooperate with a riser ratchet 47, which is a portion of the riser 32, such that the riser 32 can freely move up and down within the sprinkler body 10, but may not rotate within and relative to the sprinkler body 10.

As mentioned above, the side inlet 12 allows water from the water source to enter the sprinkler body 10. More specifically, the cylindrical wall 34 is generally orthogonal to the longitudinal axis X of the sprinkler body 10 and surrounds and defines an inlet plate 18 including the inlet passage 20. The inlet plate 18 may be flat, may follow the general contour of the tubular wall 11, or may be located above or below the contour of the tubular wall 11.

The inlet passage 20 includes a pair of preferably semi-circular ports 22 defined by the plate 18 such that ports 22 are separated by a reinforcement member in the form of a brace or crosspiece 38 and surrounded by a reinforcement member in the form of an annular collar 54. It should be noted that the inlet passage 20 may include an alternatively numbered and shaped ports, though it is preferable that the ports 22 are surrounded by the collar 54 such that the ports 22 are separated a distance from the cylindrical wall 34, as will be discussed below. It is also preferred that the ports 22 are shaped to minimize sharp angles that would lead to stress concentrations. The preferred crosspiece 38 has an orientation parallel to the central longitudinal axis X of the sprinkler body 10, and one of the reinforcement ribs 48 preferably comprises or joins with the crosspiece 38 to bisect and support the side inlet 12.

Figure 1:
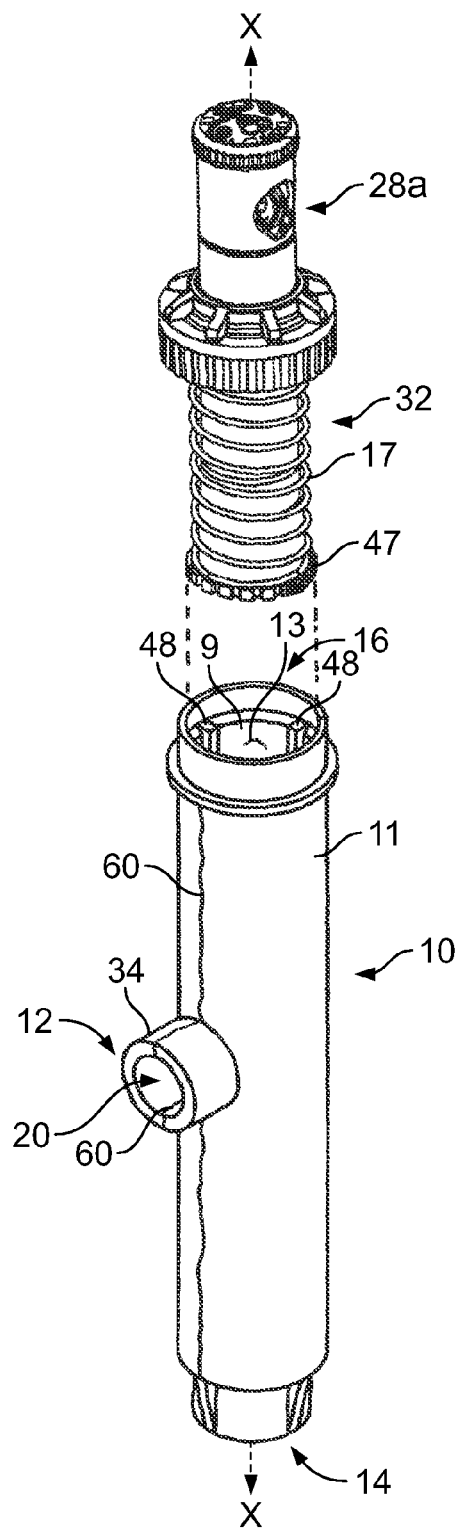
FIG. 1 is a perspective view of a sprinkler having a side-inlet sprinkler body embodying features of the present invention.
Figure 2:
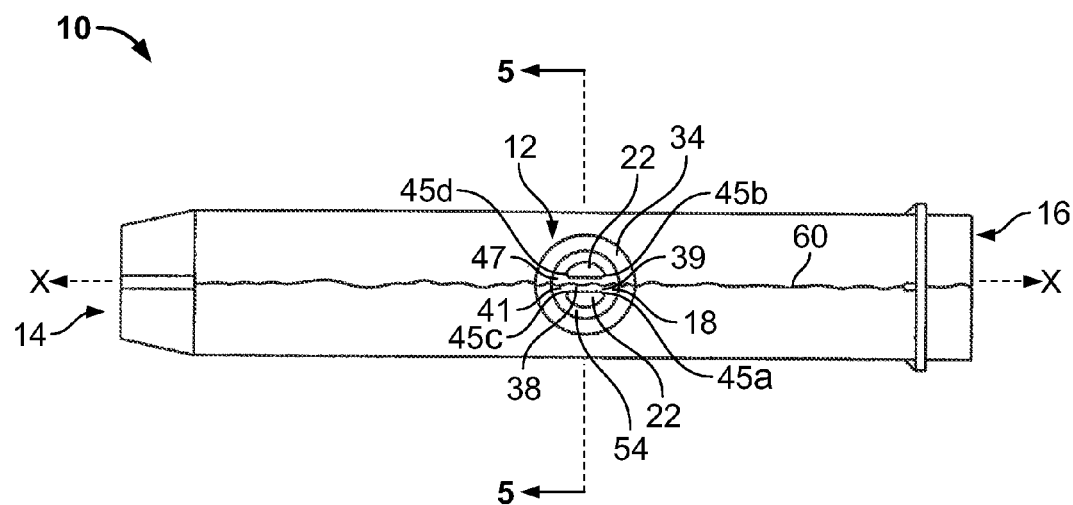
FIG. 2 is a side elevation view of the sprinkler body of FIG. 1.
Figure 3:
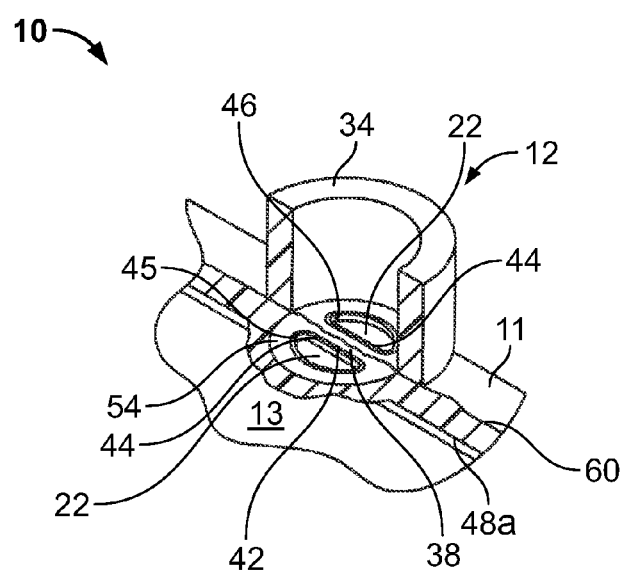
FIG. 3 is a fragmentary partial cross-sectional view of the sprinkler body of FIG. 1.

The sprinkler body 10 may be formed by an injection molding process. As a result, the sprinkler body 10 often includes an area of non-uniform mechanical properties, or weakening feature, such as a knit or mold line 60. As illustrated in FIGS. 1 and 2, the knit line 60 is located on the tubular wall 11 and generally extends the entire length of the body 10, though it may extend only a portion thereof. As the knit line 60 is formed by two leading edges of molten plastic flows that are intended to have identical flow rates, the knit line 60 is generally straight though slightly irregular, a fact that is exaggerated for illustrative purposes in the accompanying figures. The knit line 60 is positioned such that it generally bisects the side inlet 12 such that a weak point of the sprinkler body 10 is along the knit line 60 and proximate the side inlet 12. That is, though slightly irregular and not necessarily straight, the knit line 60 is generally parallel to the central longitudinal axis X and crosses the side inlet 12. More specifically, the knit line 60 is generally aligned with the center of the side inlet 12, and the crosspiece 38 is positioned through the center of the side inlet 12 such that the crosspiece 38 and knit line 60 are generally aligned with each other and with the longitudinal axis X. It should be noted that, when the crosspiece 38 is aligned with the knit line 60 in the region of the side inlet 12 and a reinforcement rib 48 is joined with or forms the crosspiece 38, the entire length of the reinforcement rib 48 may, accordingly, be aligned with the knit line 60, providing further reinforcement of the sprinkler body 10.

As discussed, the ribs 48 cooperate with the riser ratchet 47 for permitting the extension and retraction of the riser 32. As such, the ribs 48 are sized for being received in the riser ratchet 47. However, the size of the ribs 48 may not be the same size as that desired for the crosspiece. As can best be viewed in FIGS. 3 and 5, the crosspiece 38 may provide further reinforcement by having sides 42 with a greater width than sides 43 of the rib 48a. It should be noted that the crosspiece 38 may, alternatively, be smaller than the general width of the rib 48a, such as where the ports 22 are dictated to have a large size due to required fluid flow therethrough.

Again referring to FIGS. 2 and 3, the intersection of the crosspiece 38 and the inlet plate 18 is described in more detail. The ports 22 are defined by a semicircular convex or filleted edge 46 of the collar 54 of the inlet plate 18 and a straight convex or filleted edge 44 of the crosspiece 38. The crosspiece 38 intersects with the collar 54 at a first transition portion 39 and a second transition portion 41. At each transition portion, the crosspiece 38 and the collar 54 form at least one rounded corner 45 and, as depicted, form four corners 45. That is, the crosspiece 38 intersects with the collar 54 at the first transition portion 39 to form a pair of rounded corner edges 45a and 45b with each corner 45a, 45b formed at the intersection of the edge 44 of the crosspiece 38 and the edge 46 of collar 54. Furthermore, rounded corners 45c and 45d are formed at the intersection of the crosspiece 38 and the collar 54 at the second transition portion 41. The plate 18 forms a mass or surface area 47 of the crosspiece 38 and the collar 54, thereby increasing the material present while still facilitating water passage through the ports 22. Because the inlet plate 18 with the surface area 47 generally is aligned with the knit line 60, the inlet plate 18 reinforces the sprinkler body 10 in the region of the knit line 60.

As described, the reinforcement members strengthen the sprinkler body 10 along an area of maximum potential stress, specifically at the knit line 60 and proximate to the side inlet 12. In the prior art, the injected plastic flowed first through the mold to form the tubular wall 11 and then flowed to the mold portion defining the cylindrical wall 34 of the side inlet 12. In this manner, the knit line 60 would be generally a line along the side of the sprinkler body 10 and, slightly distorted or widened, along the side of the cylindrical wall 34 of the side inlet 12. With the addition of the crosspiece 38, the flow of the injected plastic does not have such precise boundaries. Prior-art sprinkler bodies typically include internal ribs, but such prior-art internal ribs do not intersect the area of maximum potential stress.

More specifically, as the injected plastic forms the crosspiece 38, the weakness of the knit line 60 is reduced in the region proximate to the cylindrical wall 34. In one manner, the crosspiece 38 serves to join, without a knit line, both sides of the knit line 60 in the tubular wall 11 proximate to the cylindrical wall 34. The reinforcing rib 48a aligned with the crosspiece 38 also serves to join both sides of the knit line 60. To the degree that a knit line may form along the length of the reinforcing rib 48a, the amount of material along the knit line is increased by the combination of the reinforcing rib 48a and the sprinkler body 10, making the knit line 60 itself stronger. The collar 54 also joins the entire periphery of the side inlet 12 without a knit line. The sprinkler body 10 may incorporate any combinations of these features to provide additional strength along the knit line 60 or to join the tubular wall 11 from both sides of the knit line 60, thereby providing greater strength and durability when subjected to pressure surges.

A Rain Bird® Model 1812 sprinkler body having a 12" length was cycle-surge durability tested. In the table below, "Control" represents a standard, unmodified 1812 sprinkler body, "Reinforced I" represents the sprinkler body modified by rotating the ribs as described above so that a reinforcing rib 48a intersected the side inlet 12, and "Reinforced II" represents the sprinkler body modified by adding the collar 54 and providing the crosspiece 38 with a wider dimension than the reinforcing rib 48a. The tests results are an average of cycles-to-failure when the sprinkler body filled with water is subjected to 0-200 psi every 5 seconds, and all failures occurred proximate to the side inlet. The following results were obtained:

|  | Control | Reinforced I | Reinforced II |
| --- | --- | --- | --- |
| Avg. Cycles to Failure | 1878 | 2224 | 2467 |
| % Different from Control | — | +18% | +31% |

FIGS. 6 and 7 illustrate the sprinkler body 10 connected to exemplary irrigation systems, which may include a plurality of sprinkler bodies 10 (only one is shown). In a typical irrigation system 100, the sprinkler body 10 is connected to a lateral pipe 122, which provides pressurized water to the sprinkler body 10. The sprinkler body 10, for instance, may be coupled to the lateral pipe 122 through a spoke pipe 123, which may include one or more swing joints 124 and one or more sections of coupling pipe 126. Generally, the spoke pipe 122 and coupling pipe 126 are PVC piping or other suitable tubing and the swing joints 124 include appropriate combinations of PVC nipples, tees, or elbow joints suitable for mating the coupling pipe 126 to the spoke pipe 123. However, other tubing and connection methods are suitable so long as a water-tight seal is maintained. In this arrangement, irrigation system 100 provides water to sprinkler body 10 through the spoke pipe 123 and also provides water to the other sprinkler bodies 10 (not shown) through the continued and uninterrupted flow of water in the lateral pipe 122.

In use, the sprinkler body 10 is coupled with the pop-up riser 32 with a spray head 28b, and has a surface flange 24 positioned flush or even with the ground level. The sprinkler body 10 can be used with a variety of spray heads, which the spray head 28b is an example. Alternatively, as shown in FIG. 1, another type of spray head 28a is illustrated. As previously discussed, the riser 32 telescopically translates through the riser opening 16 into the cavity 13 of the sprinkler body 10. When water is provided to the irrigation system 100, water flows through the spoke pipe 122 and the bypass pipe 123 and into the sprinkler body 10. At this point, the water pressure causes the riser 32 to extend a predetermined distance out of the sprinkler body 10, as shown in FIG. 6, to provide water to the surrounding area. When watering is complete and the irrigation water is shut off, the riser 32 retracts or slides back into sprinkler body 10, as shown in FIG. 7.

FIG. 7 illustrates the sprinkler body 10 within a second exemplary irrigation system 110 using an alternative coupling method and spoke pipe 125. In this alternative connection, a swing pipe or flexible pipe 128 is coupled to sprinkler body 10 using joints 134. In this connection method, the joints 134 are generally male NPT pipe couplers and barb elbow joints, though any suitable method that secures or couples the swing pipe 128 to the sprinkler body 10 is suitable. As discussed above, FIG. 7 shows the sprinkler body 10 with the spray head 28b and the riser 32 in the retracted or withdrawn position such that the riser 32 is telescopically received into the cavity 13 of the sprinkler body 10 and a top surface 29 of the spray head 28b is flush with the flange 24.

It will be understood that various changes in the details, materials, and arrangements of parts and components which have been herein described and illustrated in order to explain the nature of the invention may be made by those skilled in the art within the principle and scope of the invention as expressed in the appended claims.

What is claimed is:

1. A sprinkler comprising:
    a molded elongated body portion configured as an irrigation sprinkler housing and having a side wall defining an internal cavity;
    an inlet defined by the side wall to permit access to the internal cavity;
    a tubular coupling extending from the elongated body portion at the inlet, the tubular coupling being configured to be coupled to an irrigation supply line and the side wall forming an annular collar inside the tubular coupling about the inlet;
    a molding knit line extending the side wall of the elongated body portion in a longitudinal direction and being bisected by the inlet;

a reinforcement structure including a reinforcing rip and a crosspiece spanning the inlet;

an intersection between the crosspiece and the side wall at the annular collar including a generally curvilinear transition between the crosspiece and the annular collar effective to reduce stress concentrations; and the reinforcement structure coinciding with at least a portion of the molding knit line along the side wall and joining both sides of the knit line on opposite sides of the annular collar at the inlet to increase the strength of the elongated body upon the internal cavity being subjected to a pressurized fluid.

2. The sprinkler of claim 1 wherein the reinforcing rib extends longitudinally along the wall of the elongated body in the internal cavity.

3. The sprinkler of claim 2 wherein at least a portion of the reinforcing rib coincides with and extends continuously along the crosspiece portion.

4. The sprinkler of claim 3 wherein the at least a portion of the reinforcing rib has a lesser width than the crosspiece portion.

5. The sprinkler of claim 1 wherein the crosspiece portion divides the inlet into at least two inlet passages.

6. The sprinkler of claim 5 wherein the at least two inlet passages have the same shape.

7. The sprinkler of claim 6 wherein the at least two inlet passages have a semicircular shape.

8. The sprinkler of claim 5 wherein the at least two inlet passages provide a smooth transition into the internal cavity of the elongated body portion.

9. A fluid conduit for an irrigation system comprising:

an injected molded sprinkler body for an irrigation system including a body tube having a wall, an inlet defined by the wall, and an inlet tube disposed on the wall of the body tube, the inlet tube configured to be coupled to an irrigation supply line, and the wall forming a collar inside the inlet tube surrounding the inlet;

a molding knit line bisected by the inlet and extending in a longitudinal direction along at least a portion of the body tube length;

a reinforcement structure including a reinforcing rib, the collar formed by the wall inside the inlet tube surrounding the inlet, and a crosspiece portion wider than the reinforcing rib bisecting the inlet;

at least a portion of the crosspiece portion coinciding with at least a portion of the molding knit line and the crosspiece portion for strengthening the fluid conduit;

the reinforcement structure extending in both the longitudinal direction and a radial direction along the wall;

an intersection between the reinforcement structure and the wall at the collar including a generally curvilinear transition therebetween effective to reduce stress concentrations; and wherein the sprinkler body is capable of directing an irrigation fluid under pressure from the inlet to an outlet of the sprinkler body.

10. The fluid conduit of claim 9 wherein the fluid conduit is a sprinkler body.

11. The fluid conduit of claim 9 wherein the reinforcement structure is at least partially located within the inlet.

12. The fluid conduit of claim 11 wherein the reinforcement structure includes ports for permitting passage of fluid therethrough.

\* \* \* \* \*

UNITED STATES PATENT AND TRADEMARK OFFICE
CERTIFICATE OF CORRECTION

PATENT NO. : 7,360,718 B2
APPLICATION NO. : 10/987401
DATED : April 22, 2008
INVENTOR(S) : Jonathan Yeh et al.

Page 1 of 1

It is certified that error appears in the above-identified patent and that said Letters Patent is hereby corrected as shown below:

Column 7, line 1, delete "rip" and insert --rib-- therefor.

Column 8, line 12, delete "crosspiece portion" and insert --reinforcement structure-- therefor.

Column 8, line 17, delete "reinforcement structure" and insert --crosspiece portion-- therefor.

Signed and Sealed this

Twenty-sixth Day of August, 2008

JON W. DUDAS
*Director of the United States Patent and Trademark Office*